US011221073B1

(12) United States Patent
Nair et al.

(10) Patent No.: US 11,221,073 B1
(45) Date of Patent: Jan. 11, 2022

(54) ROTARY SEAL AND BEARING

(71) Applicant: Pyrodyne Thermal, LLC, Albuquerque, NM (US)

(72) Inventors: Keith Denton Nair, Bristol (GB); Daniel Christien Spokes, Newent (GB)

(73) Assignee: Pyrodyne Thermal, LLC, Albuquerque, NM (US)

( * ) Notice: Subject to any disclaimer, the term of this patent is extended or adjusted under 35 U.S.C. 154(b) by 54 days.

(21) Appl. No.: 16/554,094

(22) Filed: Aug. 28, 2019

Related U.S. Application Data

(63) Continuation-in-part of application No. 15/457,636, filed on Mar. 13, 2017, now Pat. No. 10,428,952.

(60) Provisional application No. 62/307,136, filed on Mar. 11, 2016, provisional application No. 61/819,363, filed on Mar. 15, 2019.

(51) Int. Cl.
| | |
|---|---|
| *F16J 15/3252* | (2016.01) |
| *F16J 15/02* | (2006.01) |
| *F23G 5/50* | (2006.01) |
| *F23G 5/20* | (2006.01) |

(52) U.S. Cl.
CPC ......... *F16J 15/3252* (2013.01); *F16J 15/022* (2013.01); *F23G 5/20* (2013.01); *F23G 5/50* (2013.01)

(58) Field of Classification Search
CPC .... F16J 15/3252; F16J 15/3256; F16J 15/326; F16J 15/3264; F16J 15/32; F16J 15/022; F16J 15/02; F16J 15/00; F16J 15/46; F16J 15/48; F23G 5/20; F23G 5/50; F23G 5/00

USPC ........................................................ 277/309
See application file for complete search history.

(56) References Cited

U.S. PATENT DOCUMENTS

| | | | |
|---|---|---|---|
| 3,776,578 A | 12/1973 | Jessup et al. | |
| 4,154,466 A | 5/1979 | Usry | |
| 4,295,824 A * | 10/1981 | Wens | F23G 5/20 |
| | | | 34/242 |
| 5,106,105 A * | 4/1992 | Drexler | F16J 15/004 |
| | | | 277/369 |
| 5,277,153 A | 1/1994 | Kakabaker | |

(Continued)

FOREIGN PATENT DOCUMENTS

| | | |
|---|---|---|
| CN | 2128723 Y | 3/1993 |
| CN | 2718318 Y | 8/2005 |

(Continued)

*Primary Examiner* — Nathan Cumar
(74) *Attorney, Agent, or Firm* — Peacock Law P.C.; Justin R. Muehlmeyer

(57) ABSTRACT

Systems and methods for sealing a static or rotary tube to a rotary tube that is part of a thermal unit performing an airless or oxygen starved high-temperature incineration process like pyrolysis. Embodiments comprise a seal comprising a bearing assembly suspended on gimbals, the bearing assembly comprising an outer housing supporting therebetween a plurality of support rollers in contact with a rolling seal disk disposed between the flanges of the tubes. Embodiments comprise features that aid in preventing the bad effects of high temperatures and axial thrust loads of the tubes, including coordinating beveled portions on the support rollers and rolling seal disk. Embodiments comprise features for modularity and ease of maintenance, including gland plates, bore holes for oil and/or grease.

21 Claims, 12 Drawing Sheets

(56) References Cited

U.S. PATENT DOCUMENTS

| | | | | |
|---|---|---|---|---|
| 5,567,380 A | * | 10/1996 | Hoover | C21D 9/0031 |
| | | | | 266/173 |
| 8,475,351 B2 | | 7/2013 | Aizawa | |
| 8,505,924 B2 | * | 8/2013 | Dietle | F16J 15/3244 |
| | | | | 277/551 |
| 2006/0131873 A1 | | 6/2006 | Klingbail et al. | |
| 2006/0147141 A1 | * | 7/2006 | Harwood | F16C 33/80 |
| | | | | 384/480 |
| 2016/0334018 A1 | | 11/2016 | Travis et al. | |

FOREIGN PATENT DOCUMENTS

| | | |
|---|---|---|
| CN | 103773402 A | 5/2014 |
| DE | 10028091 A1 | 3/2001 |
| GB | 1307180 | 2/1973 |
| GB | 2096554 A | 10/1982 |
| GB | 2244528 A | 12/1991 |
| JP | 200882559 | 4/2008 |

\* cited by examiner

ROTARY SEAL AND BEARING

CROSS-REFERENCE TO RELATED APPLICATIONS

This application is a continuation-in-part application of U.S. patent application Ser. No. 15/457,636, entitled "Mechanical Rotary Hydraulically Cooled Seal, Roller Support and Drive for Thermal Kiln Retorts", filed Mar. 13, 2017, which claims priority to U.S. Prov. Pat. App. No. 62/307,136, entitled "Mechanical Rotary Hydraulically Cooled Seal, Roller Support and Drive for Thermal Kiln Retorts", filed on Mar. 11, 2016. This application also claims priority to U.S. Prov. Pat. App. No. 62/819,363, entitled "Rotary Seal and Bearing", filed Mar. 15, 2019. This application also relates to U.S. patent application Ser. No. 15/457,807, entitled "Materials Handling System for Feed Injection to Thermal Kiln Retorts", filed on Mar. 13, 2017, which claims priority to U.S. Prov. Pat. App. No. 62/307,187, entitled "Materials Handling System for Feed Injection to Thermal Kiln Retorts", filed on Mar. 11, 2016. This application also relates to U.S. patent application Ser. No. 15/457,885, entitled "Ash Handling System for Thermal Units", filed Mar. 13, 2017, which claims priority to U.S. Prov. Pat. App. No. 62/307,216, entitled "Ash Handling System for Thermal Units", filed on Mar. 11, 2016. The specifications thereof are incorporated herein by reference.

BACKGROUND OF THE INVENTION

Field of the Invention (Technical Field)

Embodiments of the present invention relate to a rotary gas and liquid tight seal and bearing for sealing and supporting the junction between a static or stationary rotary tube such as a feed pipe and a rotating tube which may be part of a kiln or retort in systems operating under high temperature and performing airless or oxygen starved incineration processes like pyrolysis.

Description of Related Art

Systems that convert waste to energy through thermal processes like pyrolysis require the processing of solids, liquids, and gases through junctions of static and rotary tubes/pipes or through junctions of two rotating tubes under high temperatures. Thermal processes often require the thermal unit of such systems to operate at temperatures up to and in excess of 200 degrees Celsius. Rotary kilns used for thermal processes ordinarily have either a static tube section from which feed material is moved into the rotary kiln for processing, a rotary tube section that operates as a kiln, and finally a second static tube section for the processed material to exit, or three rotary tube sections, a feed section, a kiln, and an exit section with two joints.

Where a static tube and rotary tube are joined to form a continuous tube, the junction of the static and rotary sections of the tube must be sealed to prevent ingress of the external atmospheres into the tubes, mixing of the external atmospheres or egress of the internal atmosphere from the tubes. Where two joined rotating tubes traverse through two static atmospheres and associated containers, the junction of the two tubes and atmospheres/containers must be sealed to prevent the two atmospheres mixing and allow the two tubes to rotate.

In systems joining static and rotary tubes that operate at high temperatures, the rotary seals commonly employed fail due to overheating, distortion and misalignment of the tubes.

What is needed is a seal to join a static or rotary tube section to the rotary tube section of a thermal unit operating under the high temperatures typical of thermal units performing an incineration process like pyrolysis or other airless or oxygen starved processes.

One method of converting waste materials to energy uses the thermal process of pyrolysis in a rotary kiln. The use of a rotary kiln requires the presence of gas and liquid tight seals between an input feed tube which is stationary and a rotating kiln tube. This seal assembly must also act as a bearing for the rotating kiln or retort. Similar exit seals are also required. Since a pyrolysis kiln may operate at temperatures up to and in excess of 1200° C., the seal will be subject to high temperatures (approx. 500° C.) which can cause distortion and misalignment.

A design of rotary seal and bearing is described in U.S. patent application Ser. No. 15/457,636, entitled "Mechanical Rotary Hydraulically Cooled Seal, Roller Support, and Drive for Thermal Kiln Retorts", filed on Mar. 13, 2017, in the name of Pyrodyne Thermal, LLC. The rotary seal described therein is both for supporting as a bearing and sealing the junction between a first feed or discharge tube and a second rotatable tube. The bearing assembly is suspended on gimbals, the bearing assembly comprising two annular bearing plates which support therebetween a plurality of support rollers that cooperate with a rolling seal disc engaging the tube junction and supported by flanges which were welded to respective ends of the joined tubes. These flanges also entrapped the rollers to control expansion. However, by requiring the flanges to provide the rolling edges for the support rollers, it was necessary that they should be machined as a matched pair to ensure a perfect running face. This meant they had to be machined as a full assembled fabrication with tight tolerances.

In the adverse conditions of a pyrolysis plant the flanges are liable to be damaged and replacement expensive and results in significant downtime. Other technical problems concern the need to increase lubrication due to the high temperatures in which the assembly was operating. Such an assembly also has a gland plate attached to the bearing plate and provided with gland packing to engage the flange faces. Another technical problem stems from the requirement to maintain surface pressure of this gland packing with the sealing face. This required manually adjusting set screws on a periodic basis. Such a design allowed for uneven pressure on this packing. The assembly of embodiments of the present invention is therefore designed to resolve these technical problems of maintenance and longevity of the components.

BRIEF SUMMARY OF THE INVENTION

The objects of the present invention are directed to systems and methods for sealing a static or rotary tube to a rotary tube that is part of a thermal unit performing an airless or oxygen starved high-temperature incineration process like pyrolysis in such a way that the joining of the tubes does not interfere with the oxygen controlled processes within the rotating thermal unit tube.

One object of the present invention is to seal the junction of a static or rotary tube to the rotating thermal unit tube in a way that prevents the ingress or egress of gases and liquids to or from the tube and allows the thermal unit tube to rotate. Embodiments of the seal of the present invention comprise rollers to support the seal while permitting one or both of the joined tubes to rotate. To seal the environment within the seal, embodiments of the present invention provide chambers within the seal in which a sealing material is placed between the seal and rotating tube elements. To ensure the stability of the seal and protect its integrity in the face of high-temperatures and distortion and misalignment in the tubes, embodiments of the seal of the present invention comprise gimbals to support and suspend the seal to allow it to move in a transverse direction, to swing, and to rotate while maintaining the seal.

Another object of the invention is to drive the rotation of the rotary tube or tubes internally to the seal while maintaining the airless or oxygen starved environment within the seal. Embodiments of the seal of the present invention comprise active rollers within the seal that drive the rotating components within the seal.

Yet another object of the present invention is to provide a seal that is easily maintainable. Embodiments of the seal of the present invention are modular in construction, permitting access to components of the seal without having to move, modify, disassemble, or alter the tubes. Certain components that may require maintenance more often, for example the sealing material, may be accessed and replaced by removing only a single plate.

Embodiments of the present invention are also directed to a sealing system for sealing the junction of an end of a first tube to an end of a second tube, the second tube attached to or functioning as a thermal unit, the sealing system comprising: a first annular flange adjacent the end of the first tube and a second annular flange adjacent the end of the second tube; a seal disc attached to one of the first and second annular flanges; and a housing supported on gimbals, and the housing at least partially surrounding the seal disc. In another embodiment, the housing at least partially surrounds at least one support roller attached to the housing and in contact with the seal disc. In another embodiment, the first annular flange comprises a running face bearing in contact with the seal disc. In another embodiment, the first and second annular flanges do not contact any surface of the housing. In another embodiment, the first and second annular flanges are shaped to receive the seal disc between them. In another embodiment, the housing further comprises at least one gland plate comprising an annular recess for receiving gland packing, the annular recess placed so that the gland packing contacts the seal disc. In another embodiment, the gland plate further comprises gland packing disposed with the annular recess, the gland packing forming a running surface seal with the seal disc. In another embodiment, the sealing system further comprises a pressurized grease system that pumps grease into the annular recess. In another embodiment, the housing further comprises at least two bearing plates and a spacer ring disposed between the bearing plates. In another embodiment, the at least two bearing plates comprise a bearing supporting the at least one support roller. In another embodiment, the at least two bearing plates comprise an opening sized to allow the bearing to be inserted into the opening from outside the bearing plates. In another embodiment, the at least two bearing plates further comprise a bearing cap sized to fit at least partially within the opening. In another embodiment, the at least one support roller and the housing comprises holes to receive grease or oil. In another embodiment, the at least one support roller comprises a beveled shape. In another embodiment, the seal disc comprises a beveled shape that interlocks with the beveled shape of the at least one support roller.

Embodiments of the present invention are also directed to a combined rotary seal and bearing assembly for sealing the junction between a first feed or discharge tube and a second rotating kiln tube comprising: flanges disposed at the junction ends of each of the tubes; a bearing assembly suspended on gimbals, the bearing assembly comprising an outer seal housing comprising two annular bearing plates which support therebetween a plurality of support rollers that cooperate with a seal disc engaging the tube junction and disposed between the flanges; and a gland plate arranged to form a surface of the housing closest to the tubes and arranged terminate short of the outer edges of the flanges. In another embodiment, a face of the support roller which engages the seal disc comprises beveled portions to provide a thrust face. In another embodiment, the assembly further comprises a gland packing member received in an annular recess in the gland plate, wherein the gland packing member is urged by means of pressurized grease into sealing engagement with side surfaces of the seal disc. In another embodiment, the assembly further comprises a pressurized grease manifold for supplying grease to the recess. In another embodiment, the support rollers are provided with axial and radial bores connected to the grease manifold.

Embodiments of the present invention are also directed to a method for sealing the junction of an end of a first tube to an end of a second tube, the second tube attached to or functioning as a thermal unit, the sealing system comprising: driving the second tube into rotation, the second tube comprising a rotary flange attached continuously along the outer circumference of the junction end of the second tube, the rotary flange attached to a seal disc; supporting a housing on gimbals, the housing encircling the outer circumference of the junction end of the first and second tubes, the housing comprising at least one roller mounted to the housing and the housing at least partially surrounding the at least one roller, and the at least one roller in contact with the seal disc such that at least one roller rolls as the rotary flange rotates; applying pressure to gland packing disposed between the housing and seal disc. In another embodiment, the method further comprises driving or allowing the first tube to rotate in relation to the second tube, wherein the first tube comprises a flange attached continuously along the outer circumference of the junction end of the first tube, the flange comprising a running face bearing in contact with the seal disc.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DETAILED DESCRIPTION OF EMBODIMENTS OF THE INVENTION

Figure 1A:
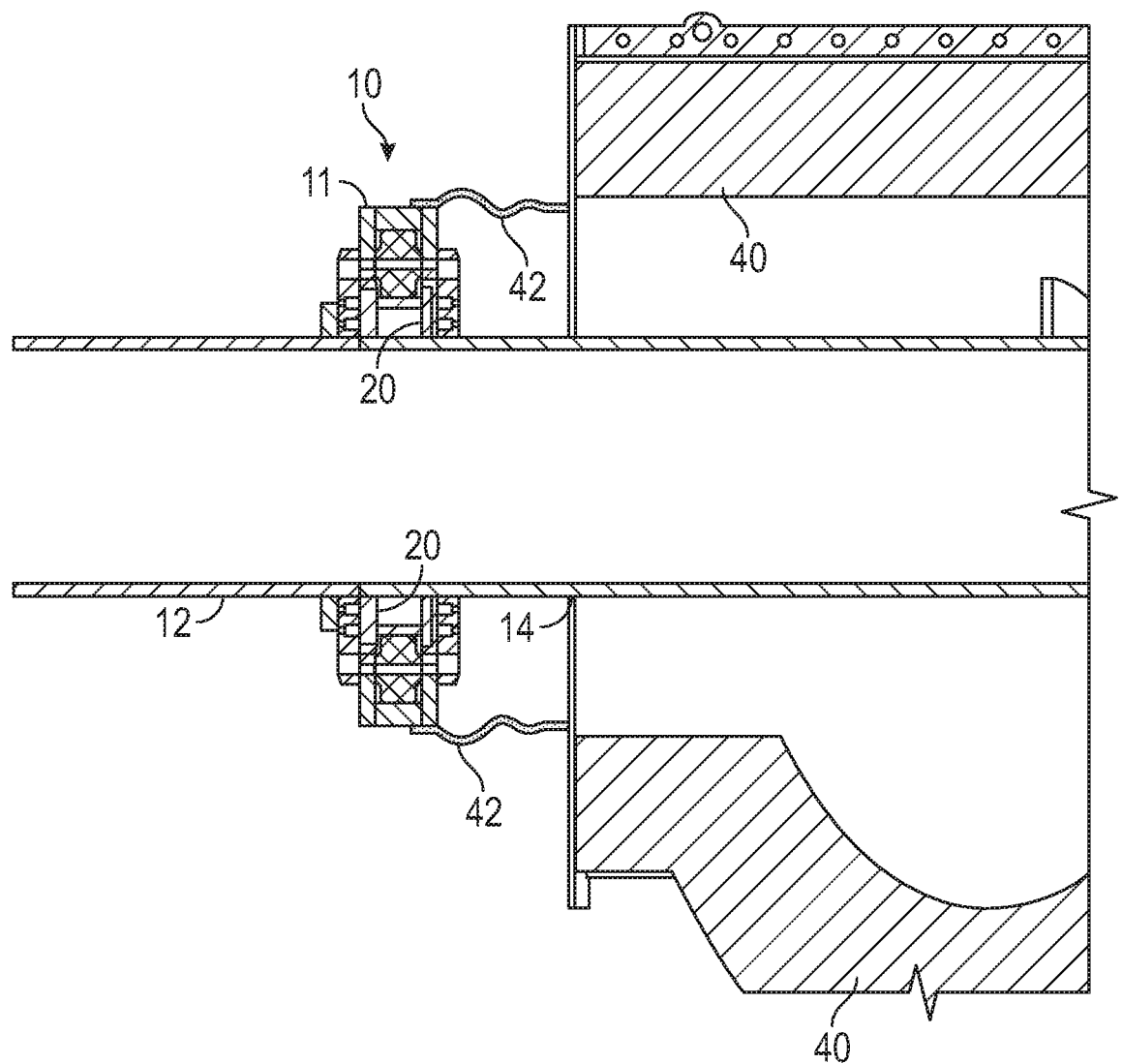
FIG. 1A is a schematic illustrating the cross section of an embodiment of the seal of the present invention sealing a static tube to the thermal unit rotary tube.
Figure 1B:
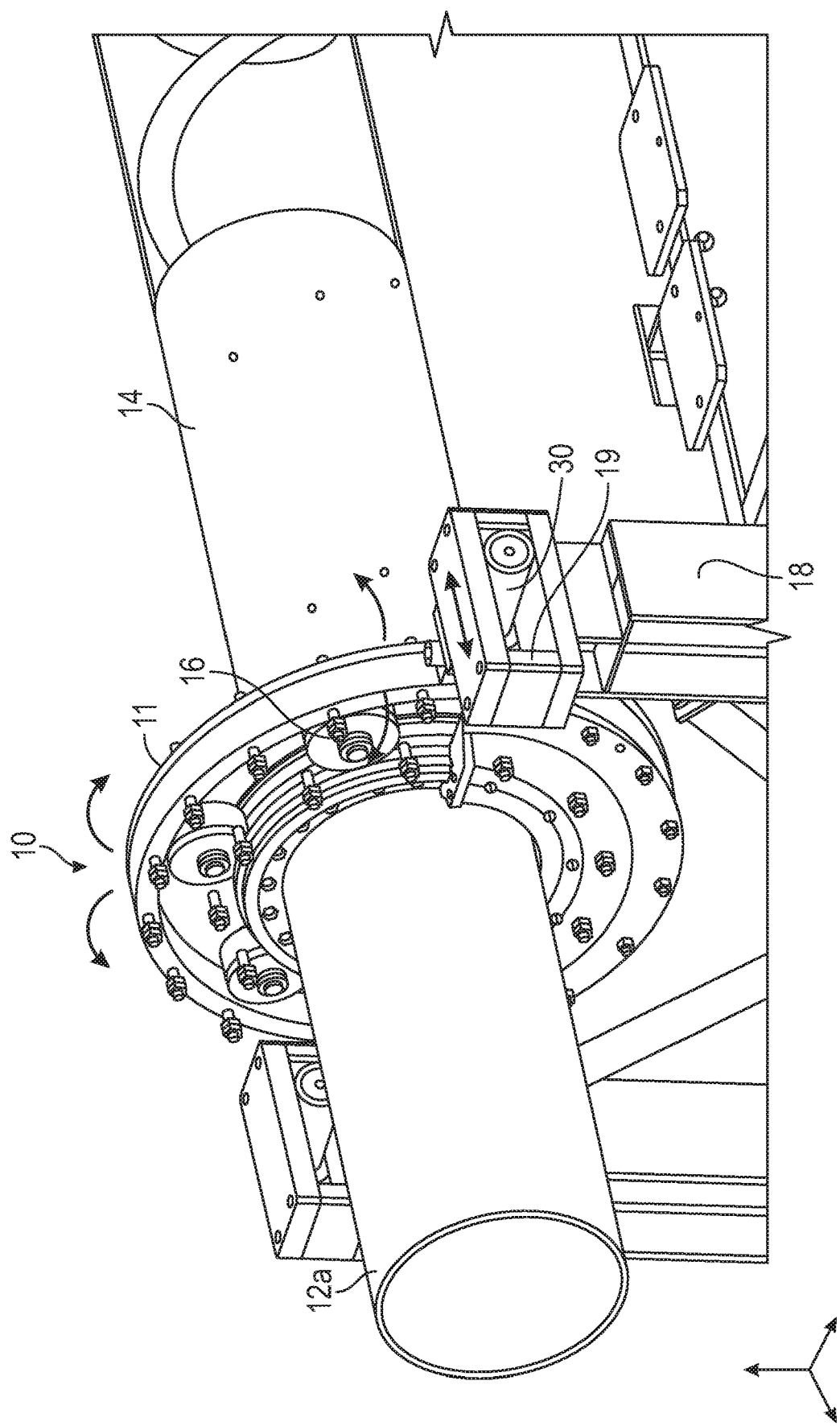
FIG. 1B is a schematic illustrating the general arrangement and partial cross section of an embodiment of the seal of the present invention from a perspective view.
Figure 2A:
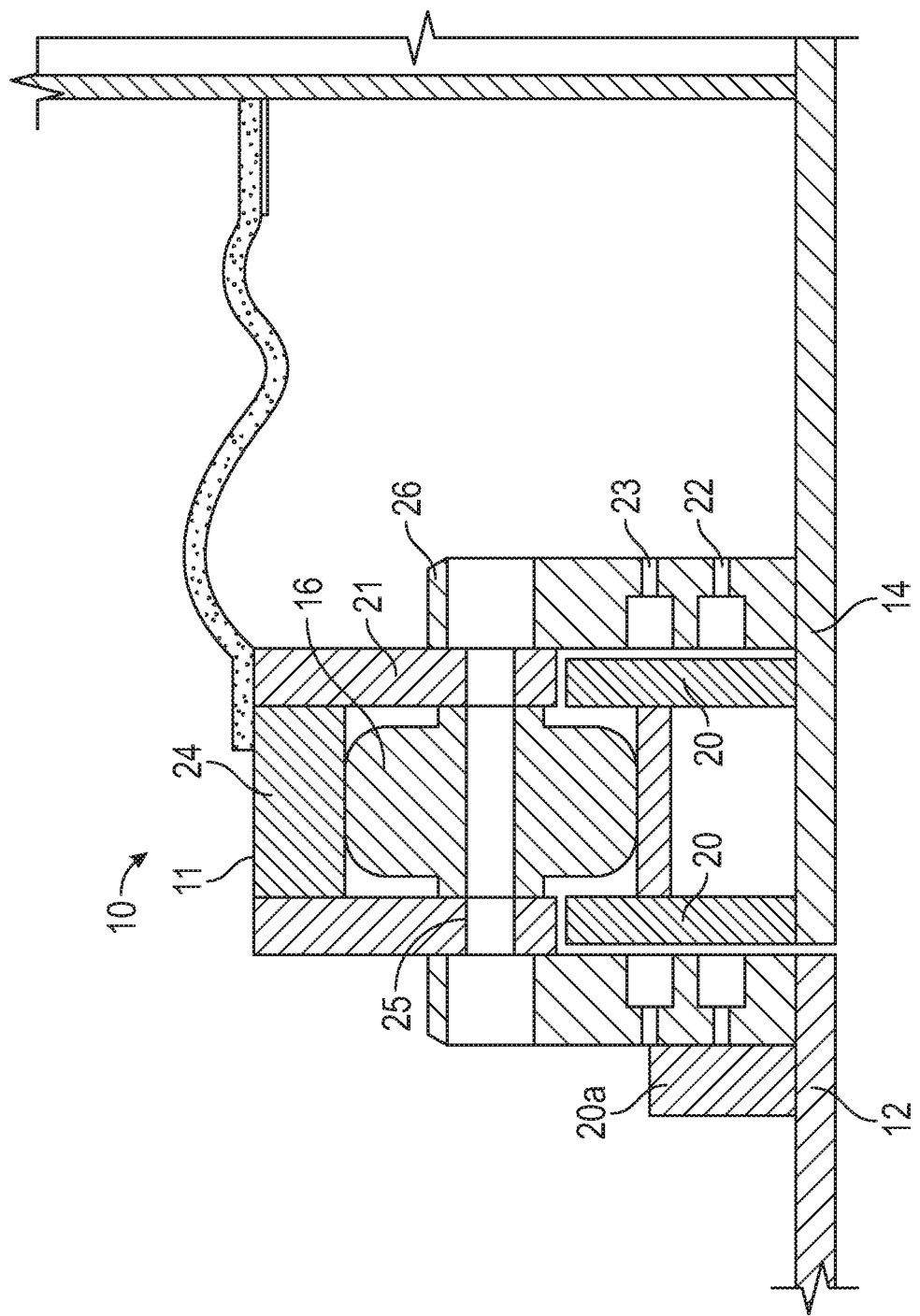
FIG. 2A is a schematic illustrating the cross section of an embodiment of the seal of the present invention sealing a static tube to a thermal unit rotary tube from a view perpendicular to the axis of the tubes.
Figure 2B:
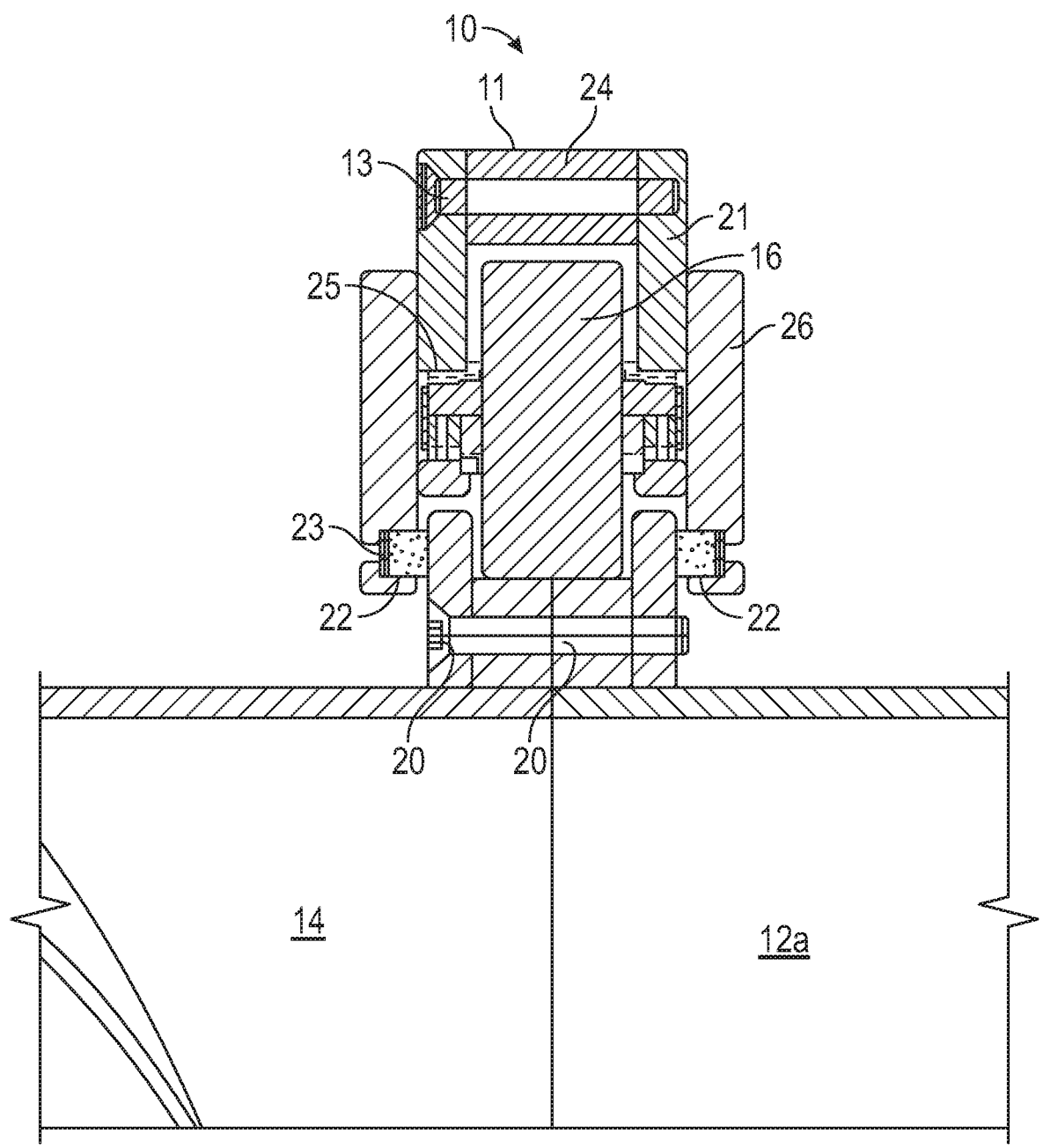
FIG. 2B is a schematic illustrating the cross section of an embodiment of the seal of the present invention sealing a rotary tube to a thermal unit rotary tube from a view perpendicular to the axis of the pipes.
Figure 3:
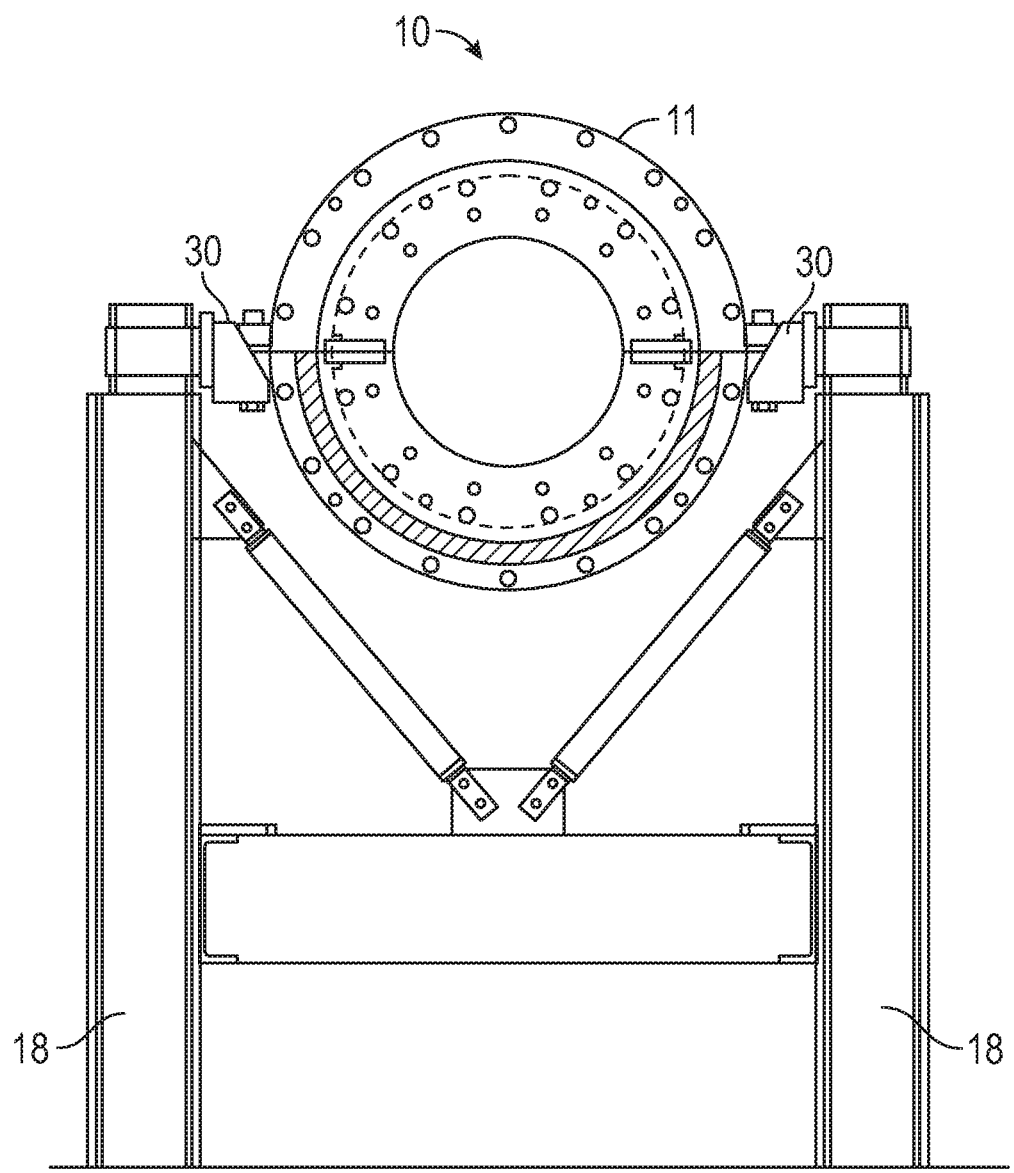
FIG. 3 is a schematic illustrating the oil level within an embodiment of the seal of the present invention from a view along the axis of the tubes.
Figure 4:
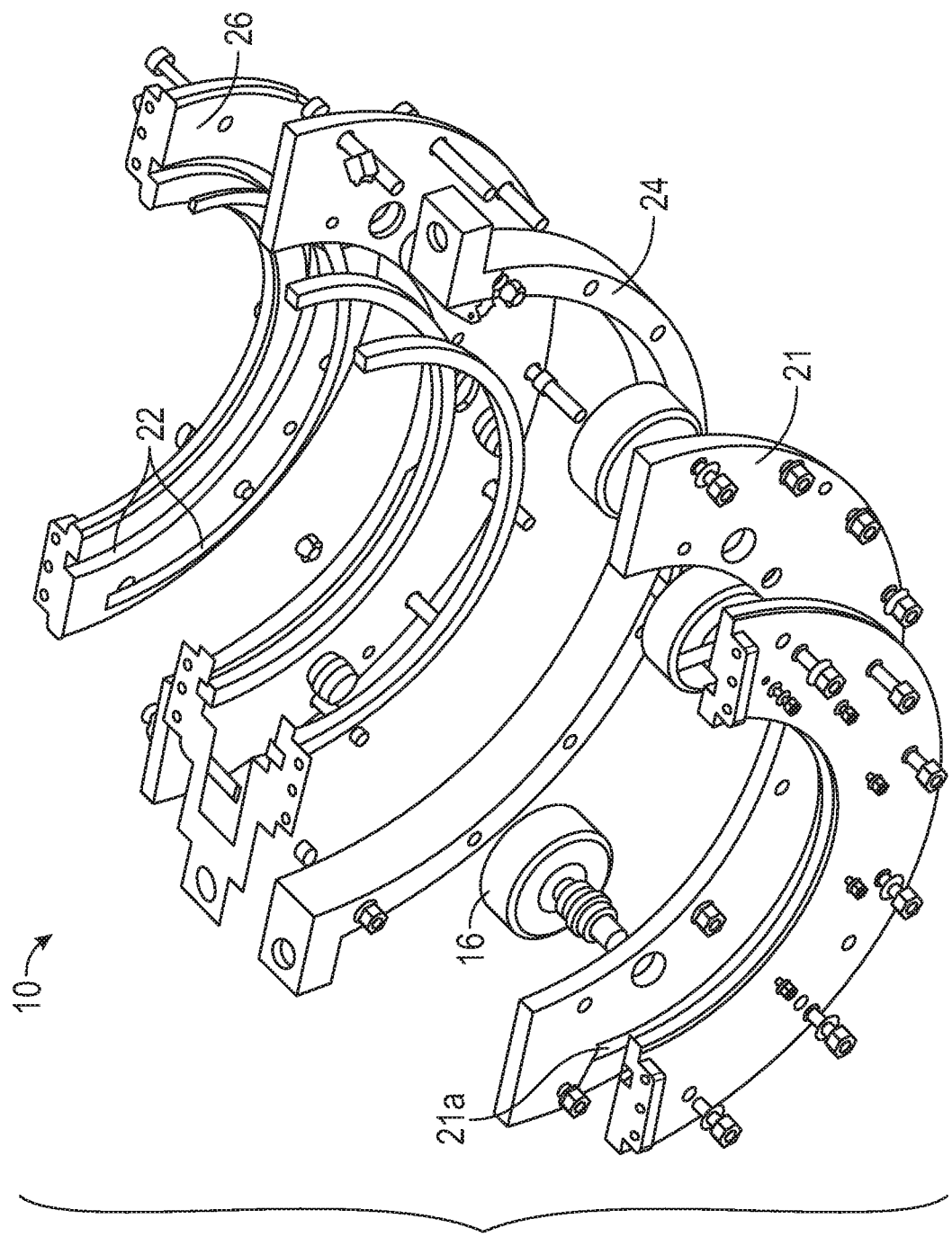
FIG. 4 is a schematic illustrating an exploded expansion view of a portion of an embodiment of the seal of the present invention.

Referring to the figures, embodiments of the present invention comprise a seal assembly 10 capable of joining static tube section 12 or a rotary tube section 12a to the rotary tube section 14 of a thermal unit performing an airless or oxygen starved high-temperature incineration process like pyrolysis. For example, in systems that convert waste material or other material to energy using the incineration process of pyrolysis, static tube section 12 and rotary section 12a may be a feeder tube through which processed material passes, and rotary tube section 14 may be a rotary kiln in which pyrolysis of the waste occurs. FIG. 1A illustrates a cross sectional view of an embodiment of seal 10 joining a static tube section 12 and the rotating tube section 14 that passes through thermal unit body 40. FIG. 1B illustrates the general arrangement and partial cross section of an embodiment of seal 10 joining a rotary tube section 12a to the thermal unit rotary tube section 14. FIG. 2A illustrates an embodiment of seal 10 joining a static tube 12 with the thermal unit rotary tube 14. FIG. 2B illustrates an embodiment of seal assembly 10 joining rotary tube 12a with the thermal unit rotary tube 14. FIG. 3 illustrates the oil level (shaded with lines) in an embodiment of seal assembly 10 from a view along the axis of the pipes. FIG. 4 illustrates an embodiment of seal assembly 10 from an exploded view.

Preferably, embodiments of the present invention comprise an atmosphere zone formed by flexible steel bellows 42 that extend from the top of seal body 11 to the thermal unit body 40, for example as illustrated in FIG. 1A. Such atmosphere zones assist in containing the high-temperature environment of the thermal unit 40. In some embodiments, atmosphere zones may be formed of any material capable of containing the high temperature atmosphere surrounding thermal units and may extend from other parts of seal 10.

Embodiments of the present invention comprise gimbals 18 on both sides of seal body 11 to suspend the seal to maintain the seal even where temperatures and/or rotation may distort or misalign tubes 12, 12a and 14. Preferably, as illustrated in FIGS. 1B and 3, each gimbal 18 comprises a post extending from the ground or a support structure to a height about midway the height of seal body 11, and comprises other support structures that connect each gimbal 18 to the corresponding gimbal 18 on the other side of seal body 11 for further support. Gimbals 18 may be of any material capable of supporting the weight of seal body 11, including but not limited to a metal. Embodiments of gimbal 18 comprise a seal extension receiver 19 that receives support extension 30 of seal body 11. Preferably, seal extension receiver 19 comprises a rectangular opening in which support extension 30 of seal body 11 is inserted. In this way, gimbals 18 support seal body 11 while allowing seal body 11 to move in a transverse direction, to swing, and to rotate as illustrated by the directional arrows in FIG. 1. The supporting cylindrical journal section of the gimbal is attached to the seal body 11 and allows rotary movement/swing of the seal body 11 as well as sliding horizontally/transversely within the gimbal body 30. Some embodiments of the present invention may employ other means for supporting seal assembly 10, including but not limited to a support structure hanging from a structure above seal assembly 10.

Embodiments of the seal assembly 10 of the present invention comprise flanges 20 or 20a to provide a surface attached to the joined tubes that the seal may contact. Preferably, as illustrated in FIGS. 1A, 2A, and 2B, flanges 20 attach to rotary tube sections 12a and 14 by welding material to the end of rotary tubes 12a and 14 so that flanges 20 rotate with tubes 12a and 14. In the embodiment of seal assembly 10 illustrated in FIG. 2B joining a rotary tube 14 to a rotary tube 12a, the flanges 20 on the ends of both joined rotary tubes 14 and 12a are bolted together by bolts 13. Rollers 16 support the seal above rotating flanges 20 within seal body 11 and the sealing material in chambers 22 seals the environment within seal body 11 by filling the space between flanges 20 and components of the seal body 11 with a material that prevents the ingress and egress of liquid or air. As illustrated in FIG. 2A, flanges 20a are welded near the end of static tube section 12 and fixed to the seal body 11. Static tube 12 will be held substantially static by flange 20a being bolted to seal body 11 but not to the flanges 20 of rotary tube 14. Flanges 20 but not flanges 20a provide a flat sealing surface and rotate against the sealing material in chambers 22. In some embodiments, flanges 20 and 20a can be attached to the tube sections by other methods including but not limited to screw thread, pressing together, or heat-shrink.

Embodiments of the seal assembly 10 comprise support rollers 16 within or surrounded by seal body 11 that support the mating faces of the static tube section 12 and rotary tube sections 12a and 14 and allow the rotary tube sections 12a and 14 to rotate. Preferably, as best illustrated in FIGS. 2A, 2B, and 4, support rollers 16 rotate about a central spindle mounted into two bearings 25 supported by bearing support plate 21 within or at least partially surrounded by seal body 11. Rollers 16 run within the valley formed by the flanges 20. Surfaces of spacer ring 24 and flanges 20 form contact surfaces for rollers 16. Preferably, the rollers 16 comprise a machined high temperature wear resistant wheel or roller.

Embodiments of the seal assembly 10 comprise a sealing material 56 placed within chambers 22 that prevents the ingress and egress of liquid and air between the inner environment of seal assembly 10. Preferably, sealing material 56 is a gland packing material placed within chambers 22 between each gland plate 26 and each bearing plate 21, sealing the spaces within seal body 11. As illustrated in FIGS. 1A, 2A, 2B, and 4, chambers 22 form a double ring within seal body 11, the gland packing material 56 within chambers 22 embedded within gland plate 26 adjustable by grub screws 23 disposed on, into, or around chambers 22. The packing can then be easily accessed to be replaced by removing a single plate, the gland plate 26, which can be removed by unbolting it from the other components of seal body 11. The seal body 11 will support the tubes on the rollers 16 while the gland plate 26 is removed and the packing is accessed. In this way, any packing within chambers 22 may be replaced without need for removing seal body 11 from tube sections 12 and 14. As best seen in FIG. 4, bearing support plate 21 may comprise a gland compression ring 21a for applying pressure to the gland packing within chambers 22. Embodiments of the seal 10 may comprise any number of rings of gland packing, or in shapes other than rings. Chambers 22 are preferably continuous rings to surround the entire circumference of the tubes 12, 12a, and 14, however in some embodiments the rings are not continuous but are broken. Preferably, gland packing 22 is of graphite, but some embodiments may comprise gland packing of any appropriate material.

Figure 5:
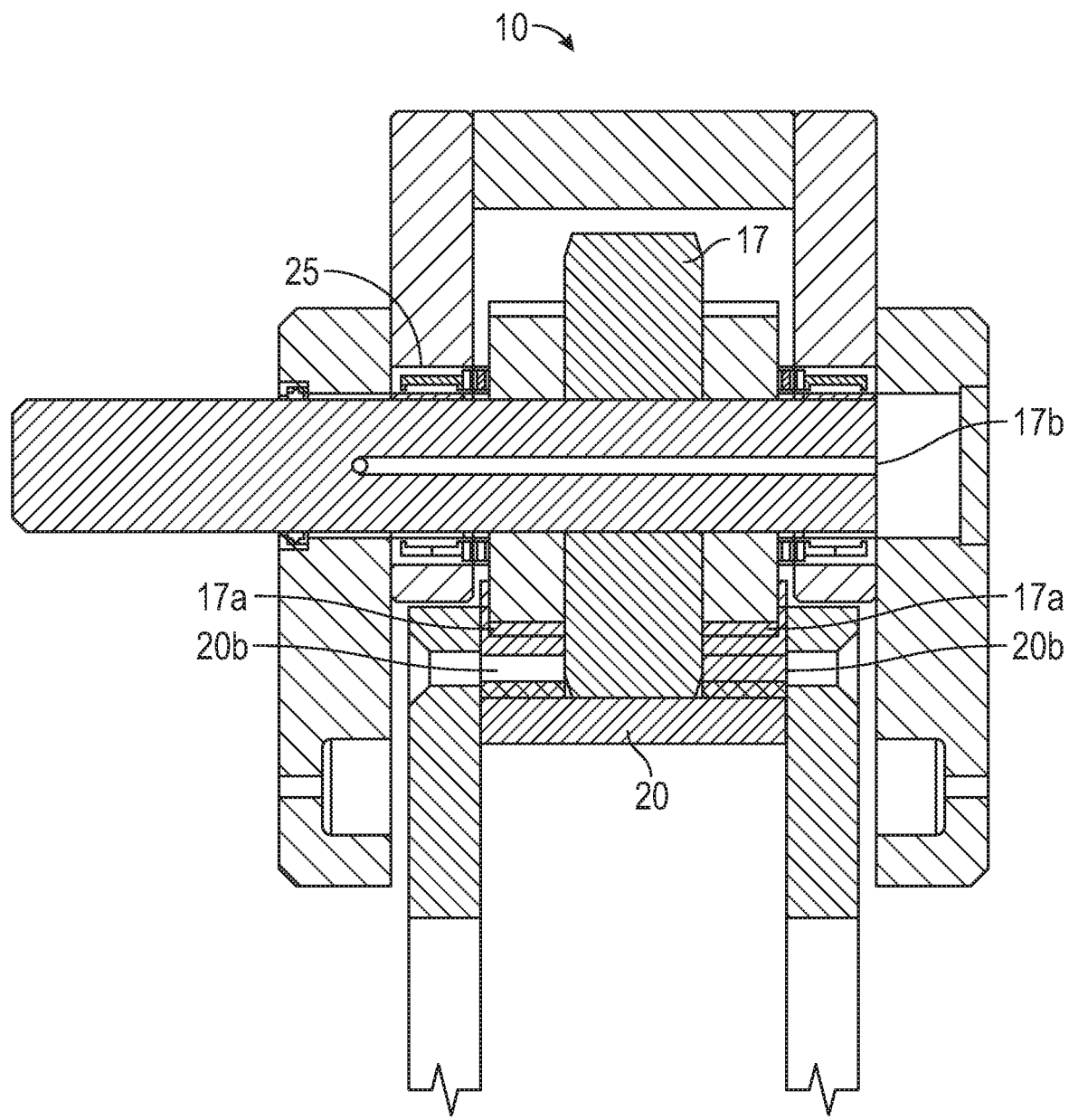
FIG. 5 is a schematic illustrating the cross section of an embodiment of the seal of the present invention comprising an active roller drive system.
Figure 6:
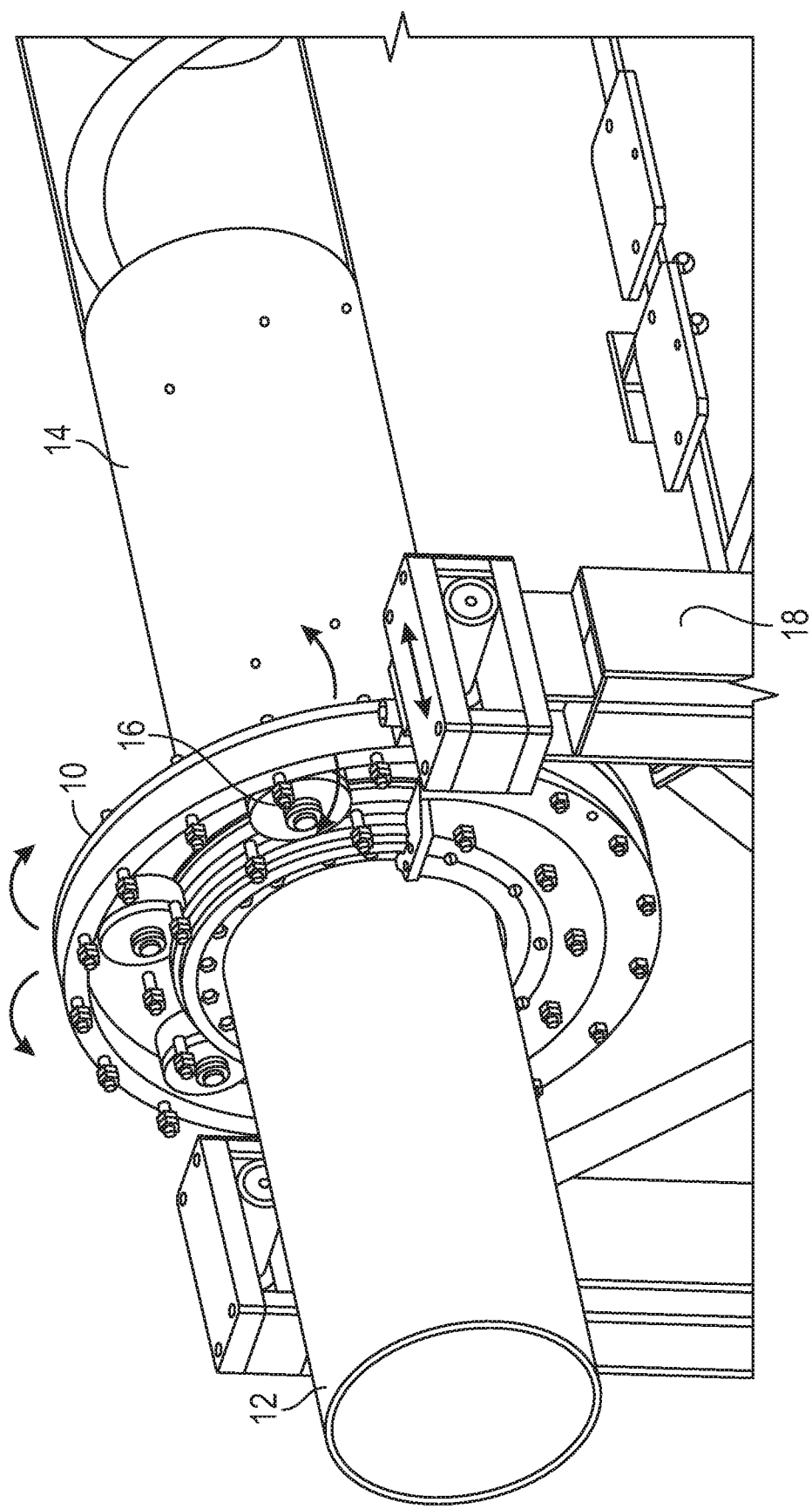
FIG. 6 is a schematic illustrating from a perspective view the general arrangement of a combined rotary seal and bearing assembly according to an embodiment of the present invention suspended in position between a feed tube and a rotating kiln with a part of its housing cut away.
Figure 7:
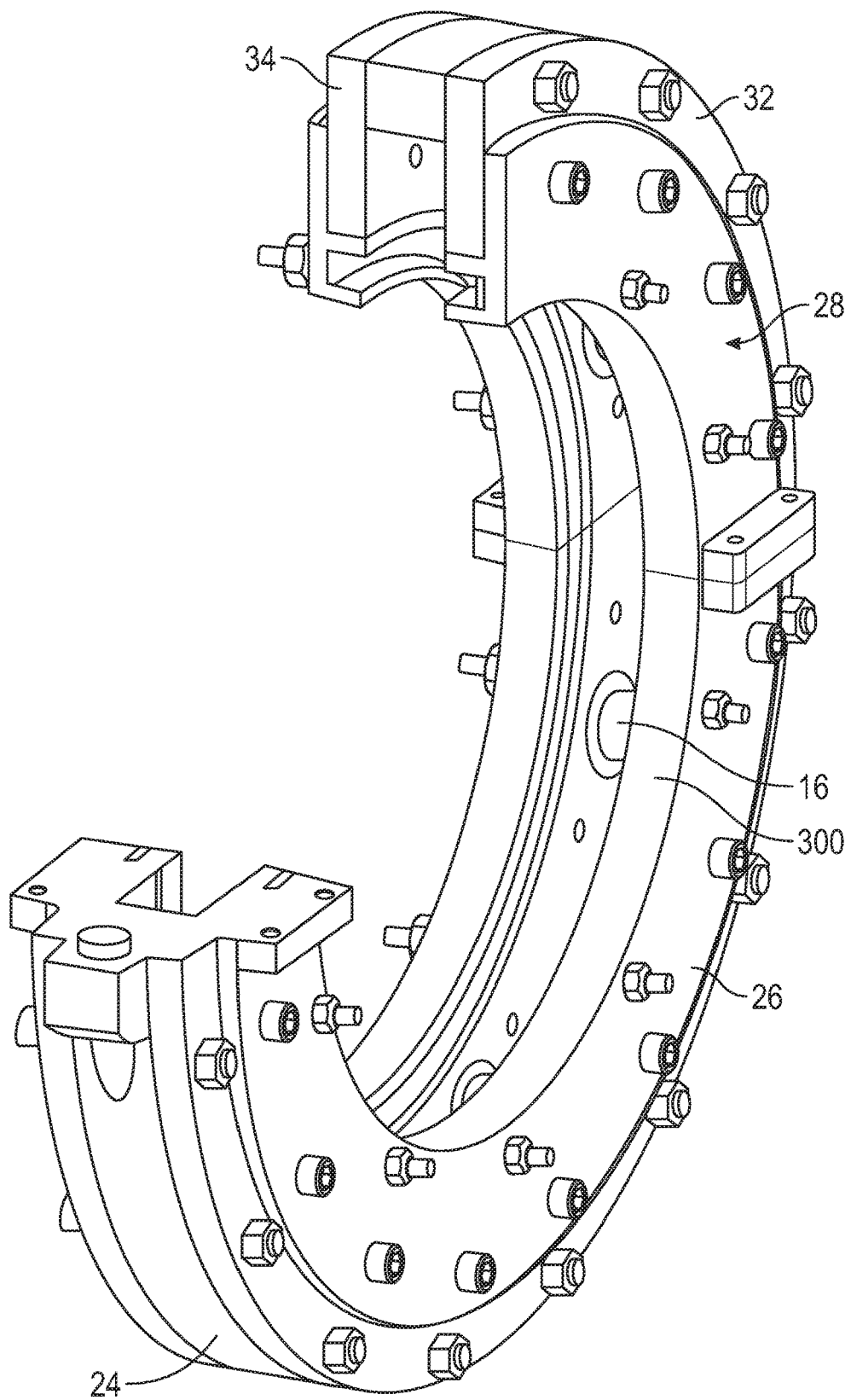
FIG. 7 is a schematic illustrating from a perspective view a partial cut-away view of the assembly illustrated in FIG. 6 from which the sealed tubes and rolling seal disc have been removed for clarity.

Embodiments of the present invention comprise a drive system to drive rotary tube 14. The drive system may be internal or external to seal body 11. Preferably, rotary tubes 12a and 14 are driven by gearing external to and independent of seal body 11, like for example, driving rotary tubes 12a or 14 by chain and sprocket. This preferred embodiment makes the seal assembly 10 easier to construct because rollers 16 are passive. However, in some embodiments of the present invention, seal body 11 comprises a drive system internal to it in which at least one of the rollers 16 is not passive but is active/driven, allowing the entire retort to be rotated internally without need to break the airtight seal. For example, as illustrated in FIG. 5, active roller 17 comprises a spur pinion drive gear with drive teeth 17a that mesh with coordinating teeth 20b embedded or cut into the inner face of flange 20. This active drive system roller 17 is connected to a drive sprocket on the end of the roller spindle 17b passing through bearing 25 and mounted externally to the seal body 11. This active roller system negates the need for a separate sprocket on rotary tube 12a or 14.

Embodiments of the present invention comprise methods and apparatuses for cooling and lubricating seal assembly 10. Referring to FIGS. 2A, 2B, and 3, spaces exist within seal body 11 formed by the structures described herein. Preferably, seal assembly 10 is flood-cooled by oil lubricant because oil lubricant both cools seal 10 as well as lubricates the graphite gland packing 22 to minimize wear and increase effectiveness of the sealing face. Other embodiments of the present invention may flood-cool seal 10 using other compositions. Referring to FIG. 3, oil lubricant is preferably inserted into seal body 11 through an oil feed near the top of seal body 11 and drained through an oil outlet near the bottom of seal body 11.

Embodiments of the present invention further comprise methods and apparatuses for adjusting gland packing material 22 to allow for wear and expansion of the gland packing material 22. Preferably, when gland packing material 22 wears, it is adjustable by spring-loaded indent grub screws 23 placed in, on, or around chambers 22, but may be adjusted any means, including but not limited to by hydraulic pressure, gas pressure, or grease pressure.

The assembly of embodiments of the present invention can also be designed to resolve the technical problems described herein of maintenance and longevity of the various components. Referring to FIGS. 6-10, embodiments of the present invention comprise a combined bearing and seal assembly 10 that seals the junction between a static feed tube 12 and a rotating kiln tube 14 of a pyrolysis plant. A similar assembly may be provided for the outlet tube at the exit of the kiln.

Figure 8:
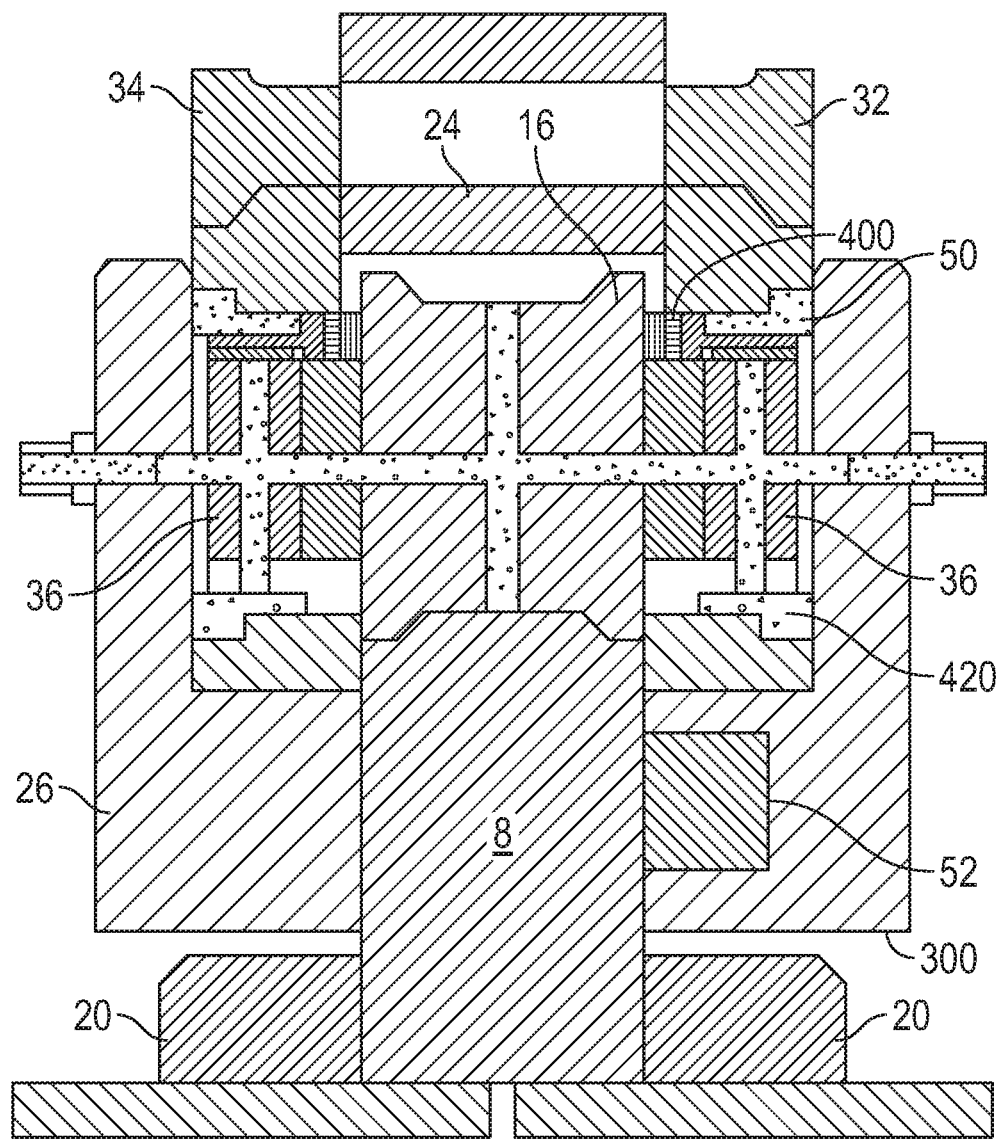
FIG. 8 is a schematic illustrating a vertical cross section through the assembly illustrated in FIG. 6.
Figure 9:
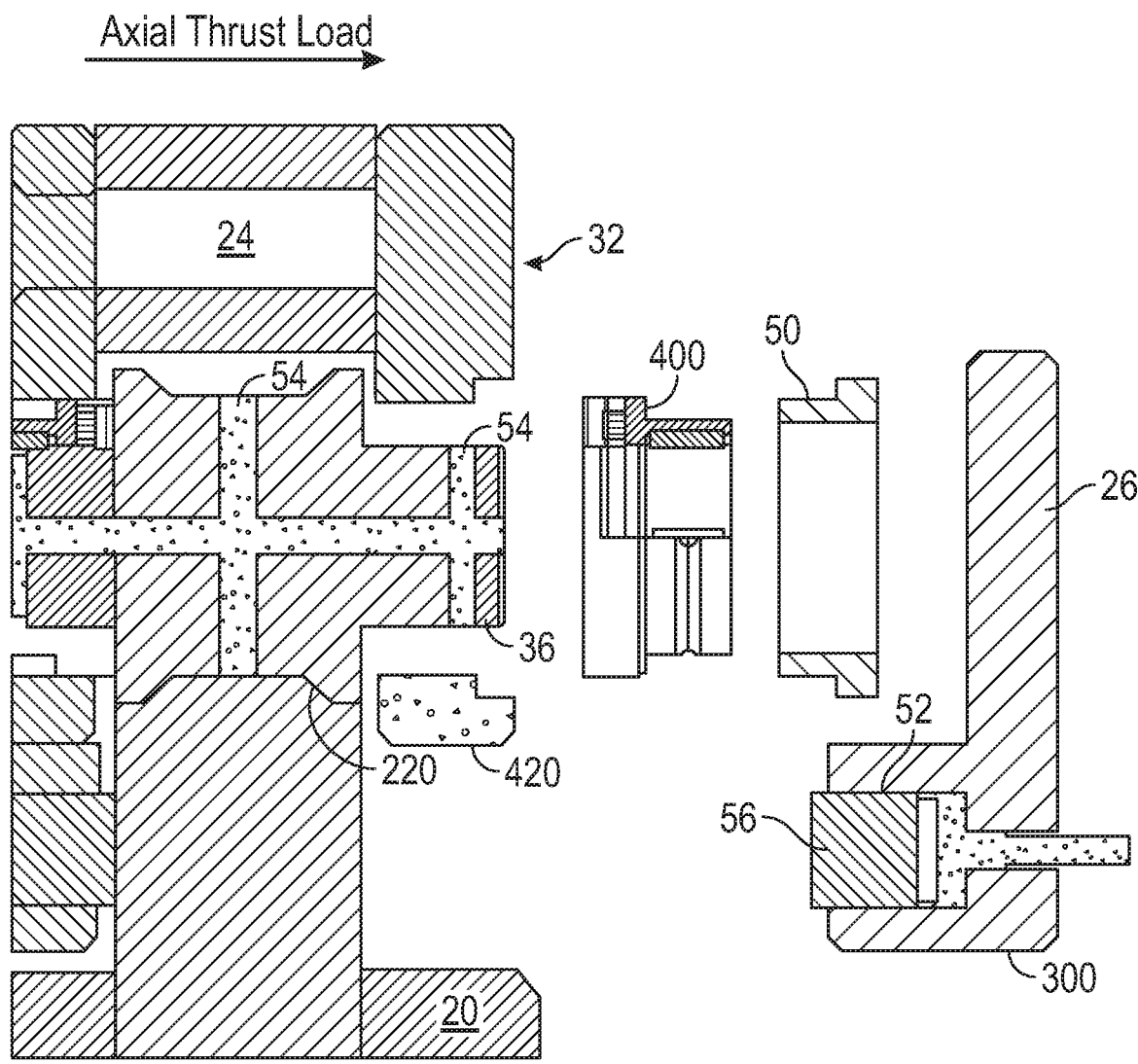
FIG. 9 is a schematic illustrating a cross section of an exploded view of the components of the assembly illustrated in FIG. 8.

Seal assembly 10 preferably comprises an annular bearing contained within an outer seal housing 28 that is supported on gimbals 18 to allow the entire assembly to pitch and yaw as well as to slide or traverse longitudinally to allow for expansion of the tubes during operation. Annular flanges 20, as shown in embodiments illustrated in FIGS. 8 and 9, are provided adjacent each end of tubes 12 and 14 to be sealed in order to engage with rolling seal disc 8 at least partially surrounded by seal housing 28 that surrounds or encircles the junction and is able to rotate within the housing together with tube 14. Preferably, flanges 20 are relatively short so as to provide clearance and not to interfere with the inner surface 300 of seal housing 28. Outer edges (which are typically flat) of flanges 20 preferably terminate short of inner surface 300. Flanges 20 are preferably designed to sandwich seal disc 8 between them but do not need to be accurately matched or machined to close tolerances as they do not interact with the remainder of seal assembly 10. Flanges 20 can therefore be comprised of simple machined components that are welded to the tubes 12 and 14 with minimal clean-up post fabrication. Preferably, flanges 20 are not bolted together and can move in rotation relative to one another since feed tube 12 can be static. Flanges 20 are preferably bolted through on the exit end but are separate on the feed end. This may require a running face bearing between seal disc 8 and fixed flange 20. Preferably, sealing disc 8 is attached to at least one flange 20. The use of the flange joint allows for dissimilar material tubes to be connected at the junction, using both flanges of the same material.

Seal housing 28 preferably comprises an annular ring comprising two spaced bearing plates 32 and 34 which are joined at their outer peripheries by spacer ring 24. Plates 32 and 34 and spacer ring 24 are preferably bolted together in standard fashion. Seal housing 28 contains a number (for example six) support rollers 16 spaced around the assembly which interact to support seal disc 8 and provide lubrication to it and, in appropriate cases, also to drive seal disc 8 in rotation and thereby drive kiln tube 14. Support rollers 16 comprise contact surfaces with seal disc 8 but preferably do not contact spacer ring 24. The bearing face of each support roller 16 is preferably cylindrical with beveled portions 220 adjacent its edges which provide a thrust face to act on seal disc 8 when the tubes 12 and 14 are expanding. The beveled shape, as depicted in the figures, provides edges or faces on which thrust can act when the tubes 12 and 14 are expanding or contracting. Other shapes can be taken as well, for example, any shape with flat angled faces. Preferably, seal disc 8 also takes a beveled shape such that the shapes of seal disc 8 and support roller 16 fit into each other or otherwise interlock or coordinate at the surfaces of mutual contact. Support rollers 16 each preferably comprise two opposed stub shafts 36 which are supported within bearings 400 in opposed circular openings 420 in the bearing plates 32 and 34 at each side of housing 28. Circular openings 420 are sized to allow bearings 400 to be inserted from outside bearing plate 32. Circular openings 420 are closed by means of an annular bearing cap 50 which also supports bearings 400. The use of a bearing cap to carry bearings 400 allows for these bearings to be extracted without the need for full system disassembly.

Support rollers 16 preferably comprise axial and radial bores or feed holes 54 both in the main body of support roller 16 and in stub shafts 36. These feed holes 54 allow grease or oil to circulate around support roller 16 to improve the oil circulation to it and its bearings and improve the lubrication which is necessary because of the high temperatures in which seal assembly 10 will operate in a pyrolysis plant. Bearings 400 can be replaced with solid bronze type greased bushes.

Preferably, gland plates 26 on each side of seal housing 28 surround the mountings for support rollers 16 and provide lateral seals against seal disc 8. Annular gland plates 26 are preferably bolted to bearing plates 32 and 34 in standard fashion. Inner surface 300 of the gland plate 26 is arranged to be spaced clear of flanges 20. This inner surface 300 is preferably the innermost surface of seal housing 28 (inner meaning closest to tubes 12 and 14 and/or flanges 20). Gland packing member 56, preferably in the form of a ring of fibre rope or graphite seal material, is preferably received within an annular recess 52 in gland plate 26. This gland packing provides a contact surface with side faces of seal disc 8. The gland packing presses lightly against the side face of seal disc 8. The purpose of the gland packing is not necessarily to hold seal disc 8 in position but to form a running surface seal.

Figure 10:
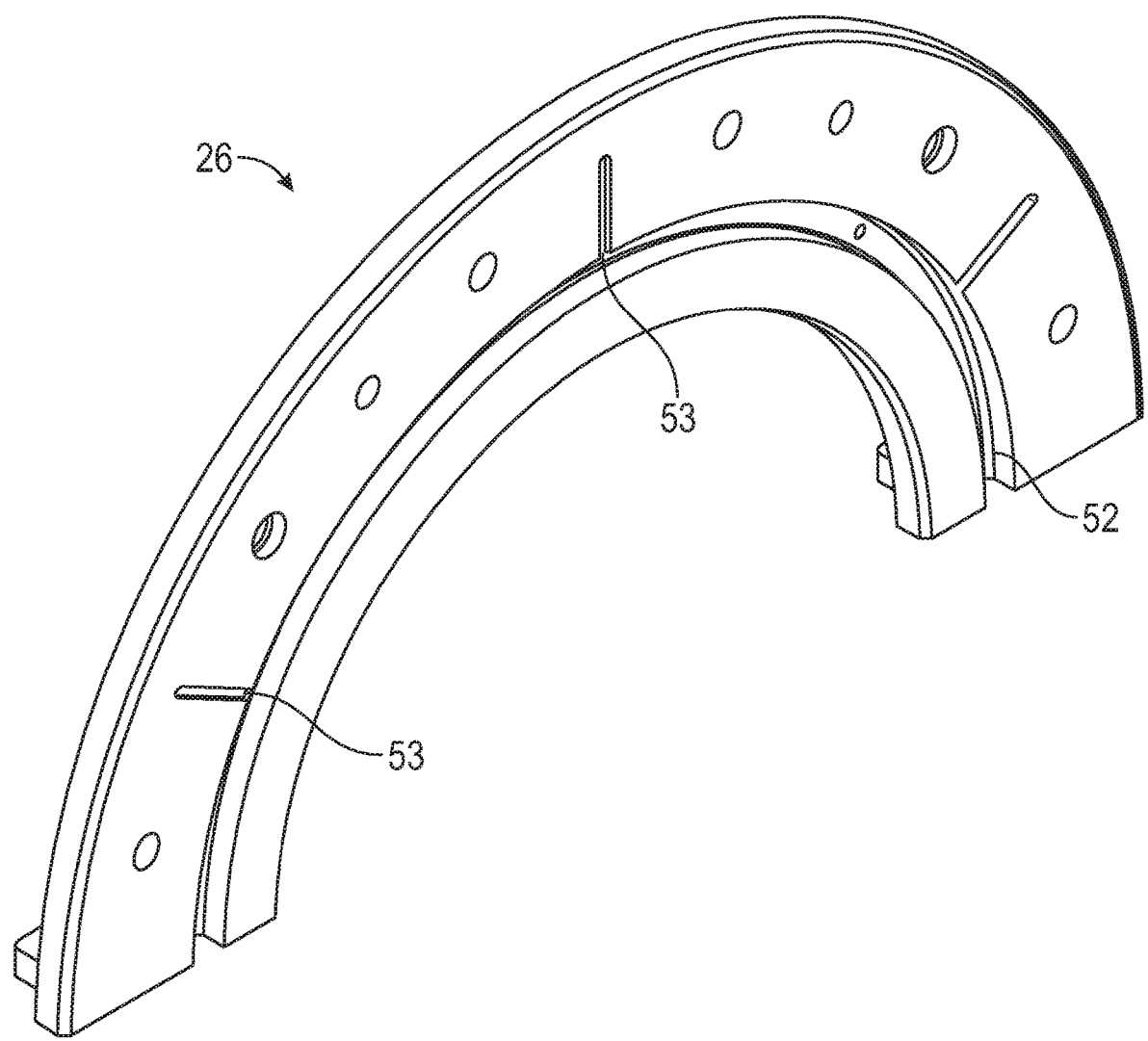
FIG. 10 is a schematic illustrating a gland plate with various grease grooves according to an embodiment of the present invention.

Instead of using indent set screws 23 to force the gland packing member 56 against the sealing plate 8, seal assembly 10 preferably comprises a pressurized grease or oil lubricant gallery behind the gland packing member 56. Preferably, the pressurized grease or oil lubricant gallery comprises annular recess 52, into which grease is pumped. In some embodiments, the grease is first pumped into a manifold disposed on or connected to gland plate 26, which provides equal pressure of grease into annular recess 52 through a plurality of grease ports in gland plate 26. Grease can also be pumped into annular recess 52 through grease nipples embedded within ports on gland plate 26. As illustrated in FIG. 10, gland plate 26 preferably comprises grease grooves 53 that provide a channel for grease from a grease port to annular recess 52. Such ports may comprise tapped holes threaded to suit available grease nipples. However, the grease is pumped into gland plate 26, as the grease leaks past gland packing member 56, it lubricates the seal face, that is, the surface of seal disk 8 in contact with gland packing member 56. Other feed holes 54 can also be supplied with grease in the manner described in this paragraph. The use of a grease manifold allows the seals to be flood cooled by grease or oil lubricant. This both cools the seal as well as lubricates the gland packing to minimize wear and increase effectiveness of the sealing face.

Embodiments of the present invention are easy to maintain. The modularity of the described design allows replacement of worn components relatively easily. For example, in order to carry out maintenance tasks on support roller bearings 16, it is only necessary to remove gland plate 26 in order to gain access to the bearing caps which can then be withdrawn from the bearing plate via jacking screws. Gland packing member 56 can also be replaced on a regular maintenance cycle, without the need for the removal of any of the seals, whether the main seal disc 8 or the bearings for the support rollers 16.

Because the seal assembly 10 is free to slide laterally, it can absorb an axial thrust load when the tube components are expanding. The beveled faces 220 on support rollers 16 are also advantageous in managing axial thrust. No thrust load is transferred to the seal materials, which might deform it or expose a seal gap on the opposite side. The mounting to gimbals 18 together with the beveled design of the faces 220 of support rollers 16 allows assembly 10 to compensate particularly well for alignment issues and distortion of tubes 12 and 14 due to heating.

One skilled in the art will realize that other embodiments of the present invention, not explicitly taught in the preceding embodiments, can likewise achieve the desired goal of the present invention. Although the invention has been described in detail with particular reference to the disclosed embodiments, other embodiments can achieve the same results. Variations and modifications of the present invention will be obvious to those skilled in the art and it is intended to cover all such modifications and equivalents. The entire disclosures of all patents and publications cited above are hereby incorporated by reference. Unless specifically stated as being "essential" above, none of the various components or the interrelationship thereof are essential to the operation of the invention. Rather, desirable results can be achieved by substituting various components and/or reconfiguration of their relationships with one another.

Note that in the specification and claims, "about" or "approximately" means within twenty percent (20%) of the numerical amount cited.

What is claimed is:

1. A sealing system for sealing the junction of an end of a first tube to an end of a second tube, the second tube attached to or functioning as a thermal unit, the sealing system comprising:
   a first annular flange adjacent the end of the first tube and a second annular flange adjacent the end of the second tube;
   a seal disc attached to one of said first and second annular flanges; and
   a housing supported on gimbals, and said housing at least partially surrounding said seal disc; and
   wherein said housing further comprises at least one gland plate comprising an annular recess for receiving gland packing, said annular recess placed so that the gland packing contacts said seal disc.

2. The system of claim 1 wherein said housing at least partially surrounds at least one support roller attached to said housing and in contact with said seal disc.

3. The system of claim 1, wherein said first annular flange comprises a running face bearing in contact with said seal disc.

4. The system of claim 1, wherein said first and second annular flanges do not contact any surface of said housing.

5. The system of claim 1, wherein said first and second annular flanges are shaped to receive said seal disc between them.

6. The system of claim 1, wherein said gland plate further comprises gland packing disposed with said annular recess, said gland packing forming a running surface seal with said seal disc.

7. The system of claim 6, further comprising a pressurized grease system that pumps grease into said annular recess.

8. The system of claim 1, wherein said housing further comprises at least two bearing plates and a spacer ring disposed between said bearing plates.

9. The system of claim 8, wherein said at least two bearing plates comprise a bearing supporting said at least one support roller.

10. The system of claim 9, wherein said at least two bearing plates comprise an opening sized to allow said bearing to be inserted into said opening from outside said bearing plates.

11. The system of claim 10, wherein said at least two bearing plates further comprise a bearing cap sized to fit at least partially within said opening.

12. The system of claim 1, wherein said at least one support roller and said housing comprises holes to receive grease or oil.

13. The system of claim 1, wherein said at least one support roller comprises a beveled shape.

14. The system of claim 13, wherein said seal disc comprises a beveled shape that interlocks with the beveled shape of said at least one support roller.

15. A combined rotary seal and bearing assembly for sealing the junction between a first feed or discharge tube and a second rotating kiln tube comprising:
    flanges disposed at the junction ends of each of the tubes;
    a bearing assembly suspended on gimbals, the bearing assembly comprising an outer seal housing comprising two annular bearing plates which support therebetween a plurality of support rollers that cooperate with a seal disc engaging the tube junction and disposed between the flanges; and
    a gland plate arranged to form a surface of the housing closest to the tubes and arranged terminate short of the outer edges of the flanges.

16. The assembly of claim 15, wherein a face of the support roller which engages the seal disc comprises beveled portions to provide a thrust face.

17. The assembly of claim 15, further comprising a gland packing member received in an annular recess in the gland plate, wherein said gland packing member is urged by means of pressurized grease into sealing engagement with side surfaces of the seal disc.

18. The assembly of claim 17, further comprising a pressurized grease manifold for supplying grease to the recess.

19. The assembly of claim 18, wherein the support rollers are provided with axial and radial bores connected to the grease manifold.

20. A method for sealing the junction of an end of a first tube to an end of a second tube, the second tube attached to or functioning as a thermal unit, the sealing system comprising:
    driving the second tube into rotation, the second tube comprising a rotary flange attached continuously along the outer circumference of the junction end of the second tube, the rotary flange attached to a seal disc;
    supporting a housing on gimbals, the housing encircling the outer circumference of the junction end of the first and second tubes, the housing comprising at least one roller mounted to the housing and the housing at least partially surrounding the at least one roller, and the at least one roller in contact with the seal disc such that at least one roller rolls as said rotary flange rotates;
    applying pressurized grease to gland packing disposed at least partially within a recess between the housing and seal disc.

21. The method of claim 20 further comprising driving or allowing the first tube to rotate in relation to the second tube, wherein the first tube comprises a flange attached continuously along the outer circumference of the junction end of the first tube, the flange comprising a running face bearing in contact with the seal disc.

* * * * *